United States Patent [19]

Gassiat

[11] Patent Number: 4,926,977
[45] Date of Patent: May 22, 1990

[54] DISK BRAKE ASSEMBLY FOR WHEELS OF LAND MOTOR VEHICLES

[75] Inventor: Alain L. Gassiat, Montussan, France

[73] Assignee: Carbone Industrie, Bagnolet Cedex, France

[21] Appl. No.: 193,082

[22] Filed: May 12, 1988

[30] Foreign Application Priority Data

May 13, 1987 [FR] France ................... 8707010

[51] Int. Cl.⁵ .................... B60T 1/06; F16D 65/78
[52] U.S. Cl. ................... 188/18 A; 188/264 AA
[58] Field of Search ...... 188/18 A, 218 XL, 264 AA, 188/264 A; 301/6 CS, 6 E, 6 WB; 192/70.12, 113 A

[56] References Cited

U.S. PATENT DOCUMENTS

| | | | |
|---|---|---|---|
| 2,172,788 | 9/1939 | Christensen | 301/6 E X |
| 3,295,640 | 1/1967 | Beuchle | 188/264 AA X |
| 3,756,352 | 9/1973 | Urban | 188/18 A |
| 3,941,221 | 3/1976 | Pringle | 188/18 A X |
| 4,226,304 | 10/1980 | Erdmann | 188/18 A |

FOREIGN PATENT DOCUMENTS

| | | |
|---|---|---|
| 1075447 | 10/1958 | Fed. Rep. of Germany . |
| 2461159 | 6/1976 | Fed. Rep. of Germany . |
| 3009006 | 9/1981 | Fed. Rep. of Germany . |
| 2440492 | 10/1979 | France . |
| 2594920 | 2/1986 | France . |
| 602730 | 6/1948 | United Kingdom . |
| 781987 | 8/1957 | United Kingdom ............ 301/6 E |
| 1081246 | 8/1967 | United Kingdom ............ 301/6 CS |
| 1202904 | 8/1970 | United Kingdom ......... 188/218 XL |

Primary Examiner—Robert J. Oberleitner
Attorney, Agent, or Firm—Bacon & Thomas

[57] ABSTRACT

A disk brake assembly including a single annular stator disk slidably mounted on fingers provided on the hub carrier of a wheel and movable into engagement against a single annular rotor disk by a plurality of hydraulically-actuated cylinders disposed within the hub carrier, the rotor disk being slidably mounted on a counter-thrust plate that is detachably secured to the front face of a hub flange and rotated by the hub.

6 Claims, 4 Drawing Sheets

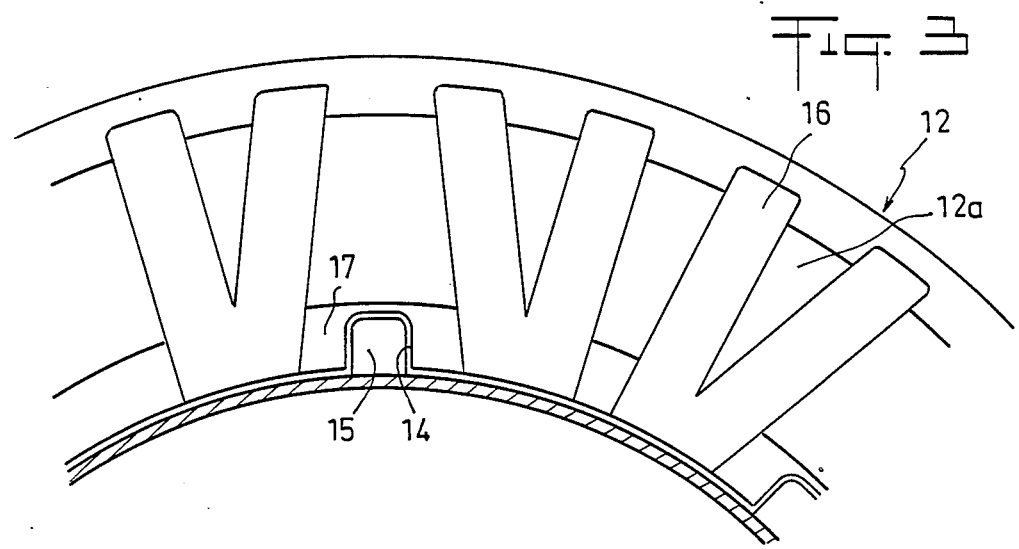
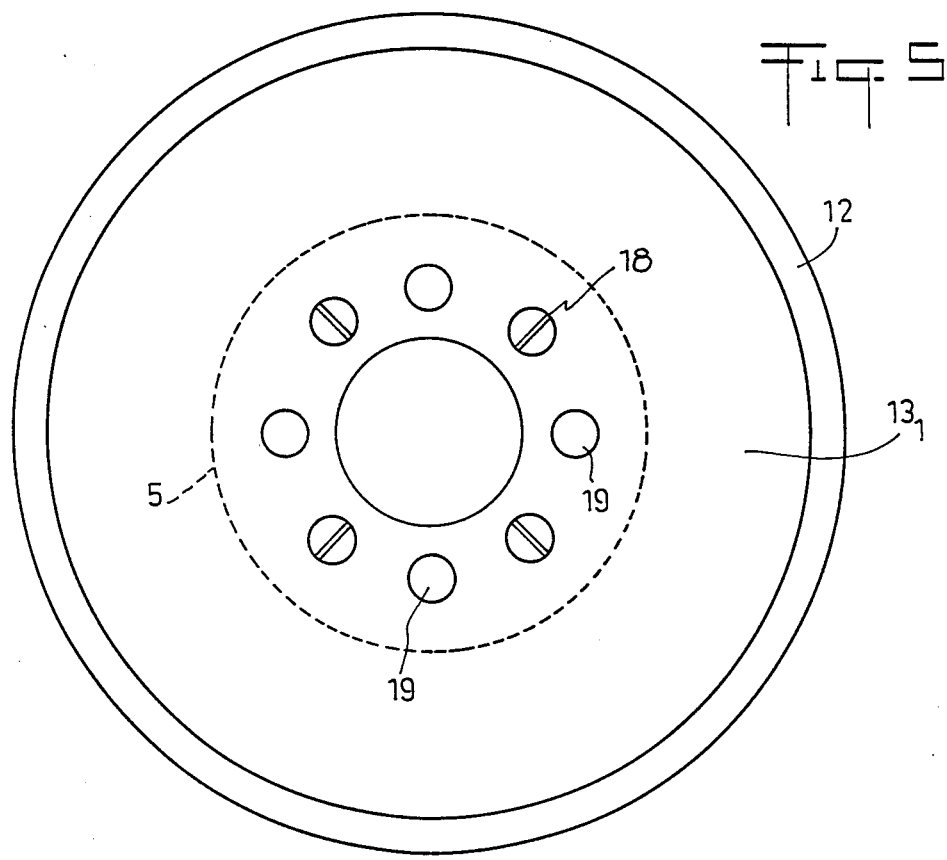

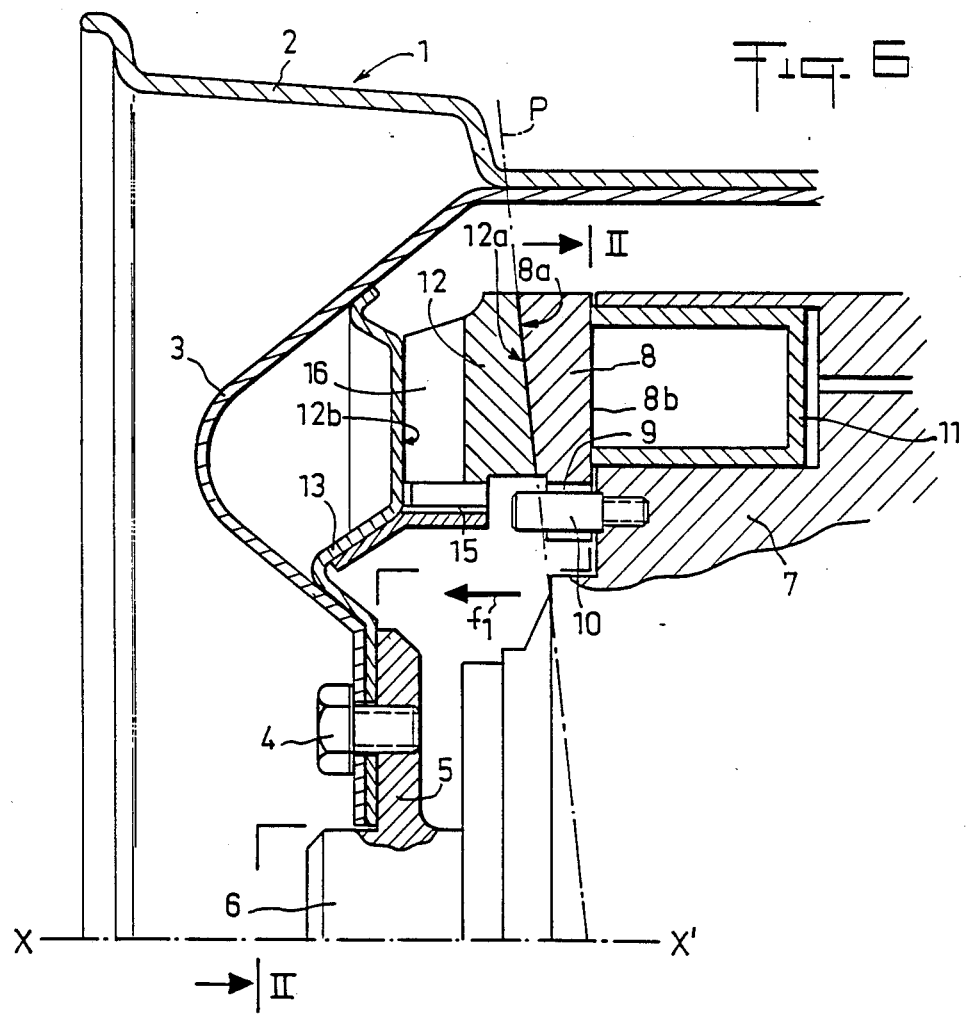

DISK BRAKE ASSEMBLY FOR WHEELS OF LAND MOTOR VEHICLES

The present invention relates to the technique of braking in motor-vehicles used on land, and more particularly, to the means used for stopping or slowing such vehicles by acting on the wheels.

The invention more specifically relates to a braking system in a vehicle using disk-brakes.

BACKGROUND OF THE INVENTION

A disk-type braking system comprises a ventilated or non-ventilated metal disk, which is rigidly fixed on the rotating hub of the wheel so as to be driven in rotation therewith.

The disk is mounted perpendicularly to the rotation axis so that its plane traverses the plane of symmetry of a caliper fixed on the hub-carrier. The caliper is provided on its flanges in opposite relationship, with two brake linings which are placed on either side of the faces of the disk astride which is placed the caliper. Hydraulic pistons actuate the linings in order to move them in opposite directions and to clamp the disk, for the purpose of stopping its rotation.

A braking device of the above type is an unquestionable improvement over the prior mechanisms, called drum brakes. Yet, such device cannot be considered as fully satisfactory for the following reasons.

Because of the mounting method used, the disk and the caliper are not directly coupled to metallic masses capable of inducing the evacuation of the calories produced by the energy dissipated by the braking action. Therefore they are subjected to overheating in cases of intensive use. An excessive rise in temperature, particularly of the disk which is generally made of metal, may be damaging to the general structure and affect braking efficiency.

With the mounting method used, the caliper is brought in contact with the disk subjected to the rise in temperature. The resulting overheating is therefore also applied to the pistons which are hydraulically actuated for clamping the linings on either sides of the disk. Overheating of the hydraulic fluid controlling the pistons may cause a failure of the braking operation if the oil vapors, released as a result, are sufficiently strong to induce the phenomenon known as vapor-lock.

The efficiency of a disk-brake is more dependent on the active surface of the linings than on that of the rotary disk. Therefore, by construction, such efficiency is limited, given that, up to the present time, the serviceable surface of the lining or linings, or even of the successive sets of plates used, is always smaller than the friction surface presented by a rotary disk.

However, a mounting of the aforesaid type, which can be considered as simplified compared with the prior drum-type systems does not give a particularly easy access to the friction linings which, as wear elements, require to be replaced periodically.

Experiments, conducted up to now, have shown that a brake of the aforesaid type is subjected, particularly when the disk is produced in a wear material, to an oxidation on all its relative part which is not covered by the linings. The oxidation of such materials increases the wear to considerable proportions.

It is also known from the prior art, particularly from patent application DE-B-1 075 447, to use a disk brake of the type comprising one rotor disk driven in rotation by the hub of a wheel, and two stator disks placed on either side of said rotor disk. One of the stator disks is moved by an annular cylinder in order to achieve the clamping of the rotor disk.

And it is also known from patent application DE-A3 009 006, to use a disk comprising a rotor, driven in rotation by the wheel hub and presenting a friction face on the hub side. The brake also comprises a stator disk supported by the hub-carrier of the wheel and presenting a friction face on the wheel side, which face is situated in facing relationship and very close to that of the rotor disk. The stator disk can be moved by an annular cylinder along a direction parallel to the hub axis.

In addition to the fact that the two above-described brakes are definitely subjected to overheating, which affects the braking efficiency, it appears that their mounting does not allow ready access to the different wear elements provided in such brakes.

SUMMARY OF THE INVENTION

It is the object of the present invention to overcome the aforesaid disadvantages by proposing a new wheel brake for motor-vehicles used on land. Such a brake, which belongs to the disk-brake family, is designed to include friction elements of a new type permitting an increased braking efficiency, a reduction in the formation of vapor-locks, and a notable improvement of the accessibility for the purpose of dismantling and replacing the wear part.

This object is reached, according to the invention, with a wheel brake for motor-vehicles used on land, which is characterized in that:

the annular stator disk is slidably mounted on fingers provided on the hub-carrier of the wheel, the moving means are constituted by hydraulically-actuated cylinders, placed inside the hub-carrier, and the rotor constitutes an annular disk slidably mounted on a counter-thrust plate adapted in removable manner on th front face of the hub flange and driven in rotation by the hub.

BRIEF DESCRIPTION OF THE DRAWINGS

The invention will be more readily understood on reading the following description with reference to the accompanying drawings, in which:

FIG. 3 is a cross-section, on an enlarged scale, taken along line III—III of FIG. 1.

FIG. 5 is a partial cross-section, taken on a different scale, along line V—V of FIG. 4.

FIG. 6 is a hald-sectional view of an alternative embodiment of the brake according to the invention.

DETAILED DESCRIPTION OF PREFERRED EMBODIMENTS

Figure 1:
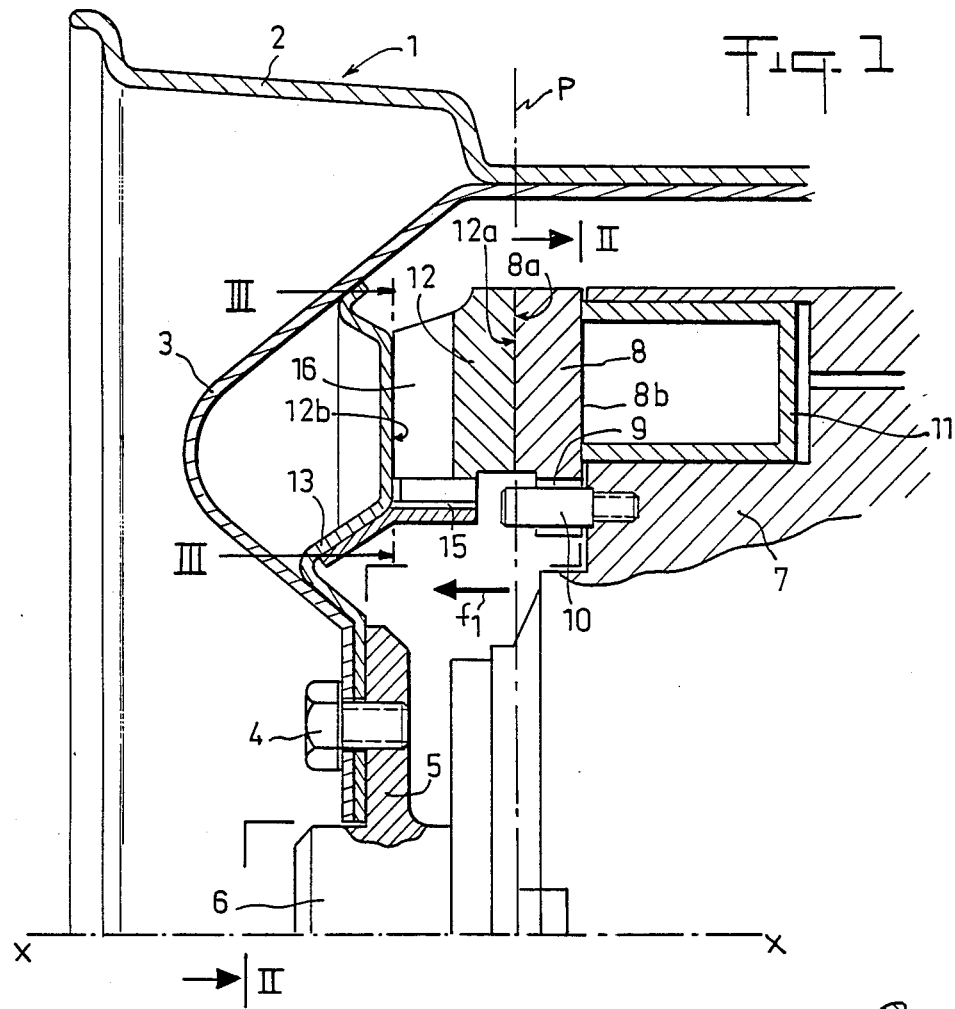
FIG. 1 is a half-sectional view of the brake according to the invention.
Figure 2:
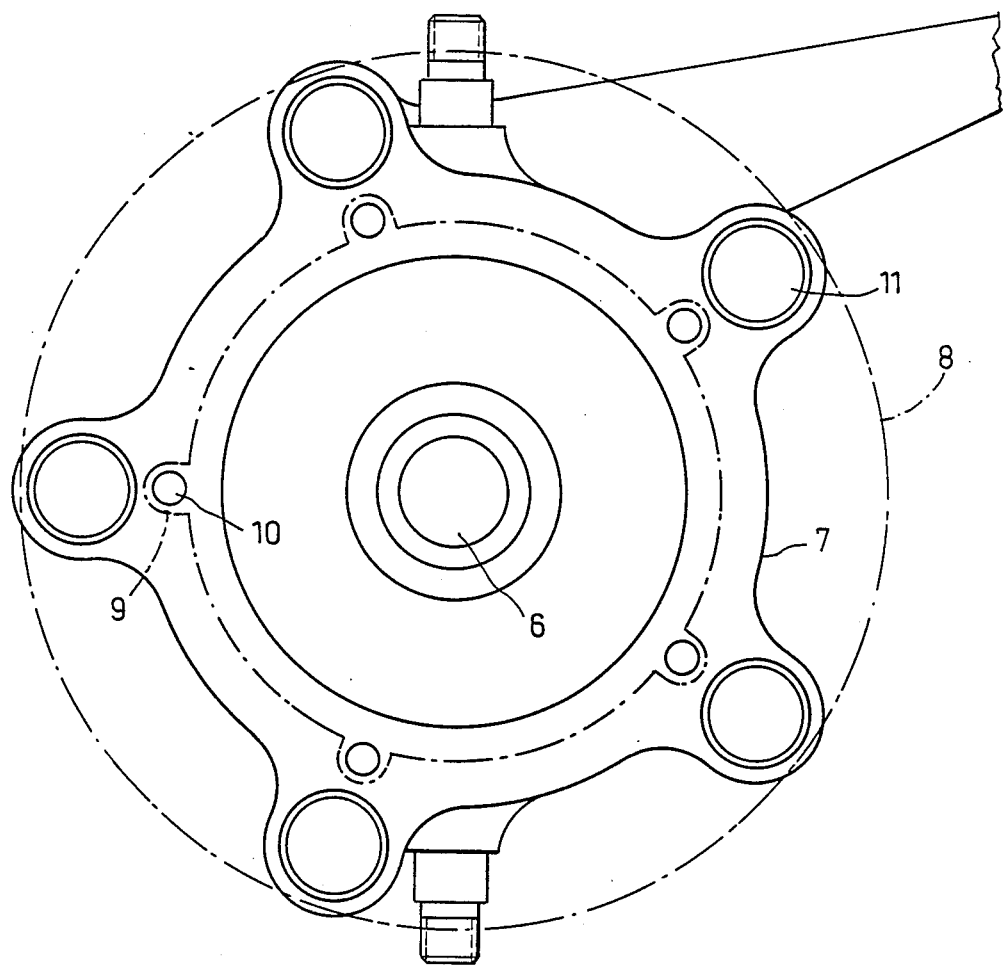
FIG. 2 is a cross-section taken along the broken line II—II of FIG. 1.

Referring first to FIGS. 1 to 3, in these figures the brake according to the invention is adapted to work with a wheel 1 of a motor-vehicle used on land. In conventional manner, the wheel 1 comprises a rim 2 associated to a run out 3 by which it is adapted, via screws or nuts 4, on the flange 5 of a rotary hub 6 mounted in a fixed hub-carrier 7, fast with the vehicle carrying structure.

According to the invention, the brake comprises an annular stator disk 8, which is slidably mounted on the hub-carrier 7, in such a way as to be displaceable in the direction of arrow $f_1$, from a stable rest position against the hub-carrier 7. The moving direction $f_1$ can be considered on the whole as being parallel to the axis X—X of the rotary hub 6.

The slidable mounting of the stator disk 8 can be achieved in several suitable ways, using a splined-type assembly. FIGS. 1 and 2 show that the stator disk 8 can comprise notches 9, preferably angularly equidistant, formed from the peripheral inner edge of the disk, so as to cooperate with as many fingers 10 adapted on the hub-carrier 7, and to extend in parallel to the axis of the hub 6.

The stator disk presents, on the wheel side, a friction face 8a, and on the hub side, a thrust face 8b which cooperates with a number of control pistons 11 housed in the hub-carrier 7 and controlled hydraulically in conventional manner. The pistons 11, which are equidistantly angularly distributed, are preferably constituted by tubular cylinders, open at their upper part in order to reduce their inertia, as well as their mass which is liable to transfer calories to the control circuit.

According to the invention, the stator disk 8 is produced in carbon-carbon.

The brake further comprises an annular rotor disk 12, carried by a counter-thrust plate 13 which is driven in rotation by the flange 5 of the hub 6.

Advantageously, the counter-thrust plate 13 is removably adapted on the front face of the flange 5, so as to allow access to the different elements constituting the brake.

The rotor disk 12 is provided, on the hub side, with a friction face 12a which is placed in facing relationship and very close to the friction face 8a of the stator disk 8. Disk 12 is slidably mounted on the counter-thrust plate 13, being supported on the latter by a splined-type assembling system. Preferably, such a system makes use of notches 14 provided, from the inner peripheral edge of the rotor disk 12, to receive teeth or moldings 15 which are formed by the counter-thrust plate 13. The rotor disk 12 comprises, on the wheel side, a face 12b provided with ventilation grooves 16 issuing into the outer peripheral edge of the disk and into a passage 17 formed from the inner peripheral edge.

According to a first embodiment, the counter-thrust plate 13 is interlocked, for example by welding, with the rim run-out 3 as illustrated in FIG. 1.

The rotor disk 12 is, preferably, also produced in carbon-carbon.

The conformation of the stator disk 8 and that of the rotor disk 12 are selected so that the faces in facing relationship and cooperating 8a and 12a are parallel together and perpendicular to the axis of the hub 6, as indicated by line P.

It is clear, on examining FIGS. 1 to 3, that the above-described constructional arrangements make it possible to produce a disk-type brake, in which the entire surface of the friction faces contribute to the braking effect. For a radial distance comparable to that of a conventional disk-brake, the brake according to the invention offers a considerably increased friction surface and a higher efficiency.

The mounting of the brake according to the invention permits the use of stator and rotor disks in carbon-carbon which are slidably mounted with respect to the fixed and rotary elements carrying them, this permitting a compensation of the differential expansion variations between these different elements.

As can be seen in FIG. 1, the constructional arrangement used permits the integration of stator 8 and rotor 12 disks, to the hub-carrier 7 and to the wheel run-out 3, respectively. These metallic members thus contribute to evacuating the calories resulting for the energy dissipated during the braking operation.

The presence of hydraulic control pistons 11 makes it possible to move laterally and away from the stator disk 8, the hydraulic fluid transfer circuit which is thus protected against vapor-locks.

The mounting of rotor disk 12 makes it possible to define between said disk and the counter-thrust plate 13, channels of substantially radial direction, which channels are formed by the grooves 16 and permit the creation, as soon as the wheel starts rotating and by centrifugal effect, of a circulation of air for cooling the rotor disk 12 or preventing it from overheating.

The mounting of rotor disk 12 on the counter-thrust plate 13 affords ready access to the different elements constituting the brake, for maintenance or replacement of any one of the wear elements.

Figure 4:
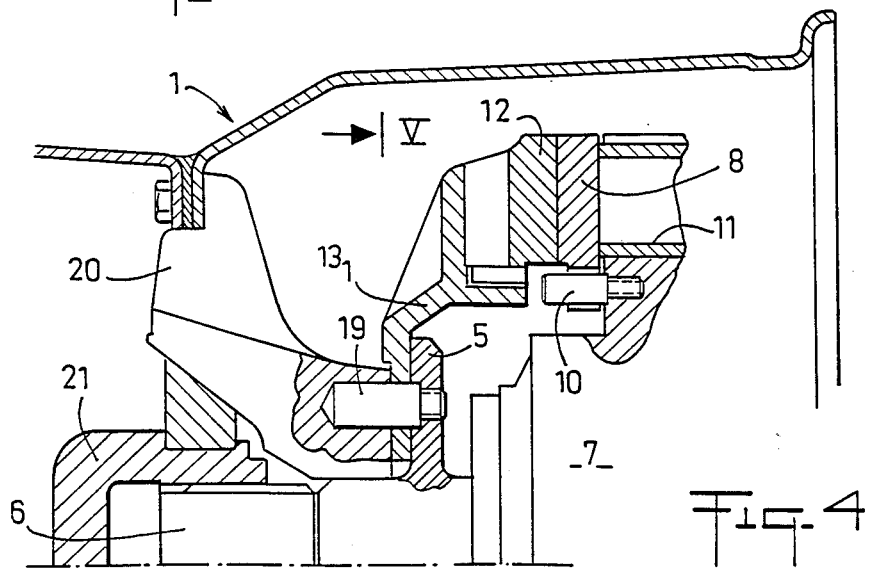
FIG. 4 is a half-sectional view of a variant embodiment of the object of the invention.

FIG. 4 illustrates a variant embodiment in which the rotor disk 12 is mounted on a counter-thrust plate $13_1$ which is immobilized at an angle and fixed on the flange 5 via screws 18 and dogs 19 used for centering a wheel 1 of which the run-out 20 is constituted by a solid molded piece, designed to cooperate with a fastening member, of nut-tupe 21, mounted on the rotary hub 6.

Regardless of the embodiment, it must be understood that the rotor and stator disks could be produced so that their faces in facing relationship 12a and 8a, while remaining parrallel together, define axisymmetrical surfaces which are in the form of truncated segments centered on the axis of the hub 6, as illustrated in FIG. 6 by line P.

The invention is not in any way limited to the description given hereinabove and on the contrary covers any modifications that can be brought thereto without departing from its scope.

I claim:

1. A disk brake assembly for a land vehicle wheel of the type including a rim and a run-out, the assembly comprising:
   (a) a stationary hub carrier;
   (b) a rotary hub supported within the hub carrier;
   (c) a single annular rotor disk formed of carbon material, the rotor disk including a first friction face and a second face, the first friction face facing a stator disk and the second face defining a plurality of ventilation grooves;
   (d) a single annular stator disk formed of carbon material slidably mounted on the hub carrier including a second fiction face having an area substantially equal to that of the first friction face;
   (e) hydraulic piston means carried by the hub carrier for urging the second friction face of the stator disk against the first friction face of the rotor disk; and,
   (f) a counter-thrust plate mounted on the rotary hub and laterally slidably supporting the single annular rotor disk, the counter-thrust plate having a portion adapted to bear against the second face of the rotor disk so as to counteract forces exerted on the rotor disk by the stator disk.

2. The disk brake assembly of claim 1 wherein the rotary hub includes a flange and the counter-thrust plate is detachably mounted on the flange.

3. The brake assembly of claim 2 wherein the counter-thrust plate is further secured to the run-out of a wheel rim.

4. The brake assembly of claim 1 wherein the rotor disk includes an inner peripheral edge defining an annular passage and the ventilation grooves are disposed in communication with the annular passage.

5. The brake assembly of claim 1 wherein the first and second friction faces are complementary and parallel and have an annular truncated configuration.

6. The brake assembly of claim 1 wherein the stator disk and rotor disk are each slidably mounted by a splined connection.

* * * * *